United States Patent [19]
Kelley et al.

[11] Patent Number: 5,496,058
[45] Date of Patent: Mar. 5, 1996

[54] APPARATUS WITH INFLATOR MOUNTING STRUCTURE

[75] Inventors: Scott A. Kelley, Algonac; Andrew J. Smydra, Rochester, both of Mich.

[73] Assignee: TRW Vehicle Safety Systems Inc., Lyndhurst, Ohio

[21] Appl. No.: 442,656

[22] Filed: May 17, 1995

[51] Int. Cl.⁶ .................................................. B60R 21/16
[52] U.S. Cl. ................................ 280/728.2; 280/728.1
[58] Field of Search ........................... 280/728.1, 728.2, 280/732; 102/530, 531; 222/3, 5

[56] References Cited

U.S. PATENT DOCUMENTS

| | | | |
|---|---|---|---|
| 3,197,234 | 7/1965 | Bertrand | 280/728.1 |
| 3,982,774 | 9/1976 | Ivashuk et al. | 280/737 |
| 5,197,756 | 3/1993 | Jarboe et al. | 280/728.1 |
| 5,310,213 | 5/1994 | Mori | 280/732 X |
| 5,351,987 | 10/1994 | Donegan et al. | 280/728.1 |
| 5,356,175 | 10/1994 | Rose et al. | 280/728.2 |

FOREIGN PATENT DOCUMENTS

| | | | |
|---|---|---|---|
| 0520537 | 12/1992 | European Pat. Off. | 280/728.2 |
| 4228232 | 3/1994 | Germany | 280/728.2 |
| 5286401 | 11/1993 | Japan | 280/728.2 |
| 9013457 | 10/1990 | WIPO | 280/728.2 |

*Primary Examiner*—Margaret A. Focarino
*Assistant Examiner*—Christopher Ellis
*Attorney, Agent, or Firm*—Tarolli, Sundheim & Covell

[57] ABSTRACT

An apparatus (10) includes an inflator (44) which provides a source of inflation fluid. A canister (20) has a chamber (34) for receiving the inflator (44). A support means (56) supports the inflator (44) in a fixed position within the chamber (34) of the canister (20). The support means (56) includes two clamp halves (94 and 96) which have a mating relationship to engage and surround a portion (68) of the inflator (44). A plurality of fasteners (136, 152 and 160) secure the clamp halves (94 and 96) in their matting relationship and secure the clamp halves (94 and 96) to the canister (20).

20 Claims, 3 Drawing Sheets

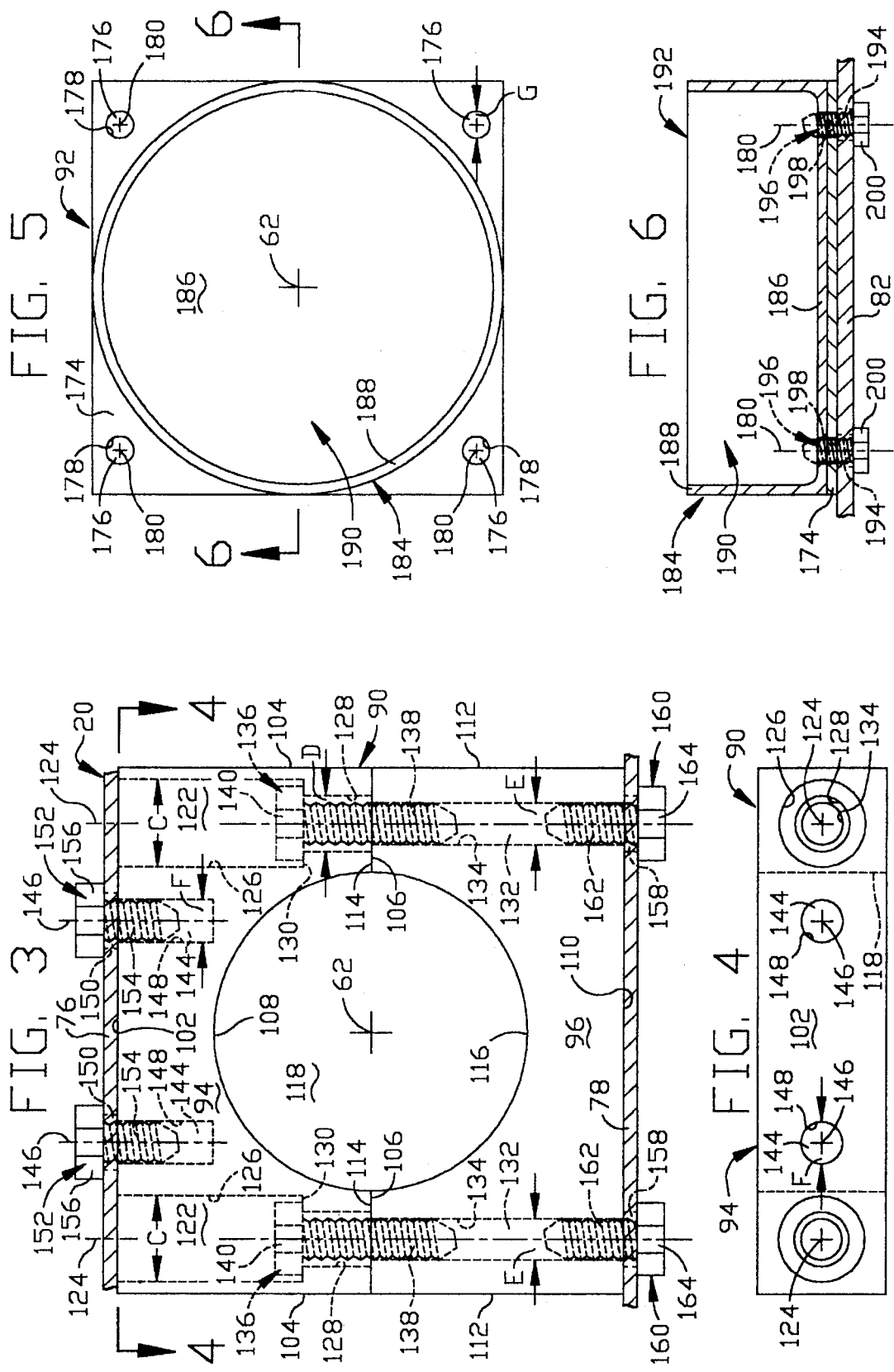

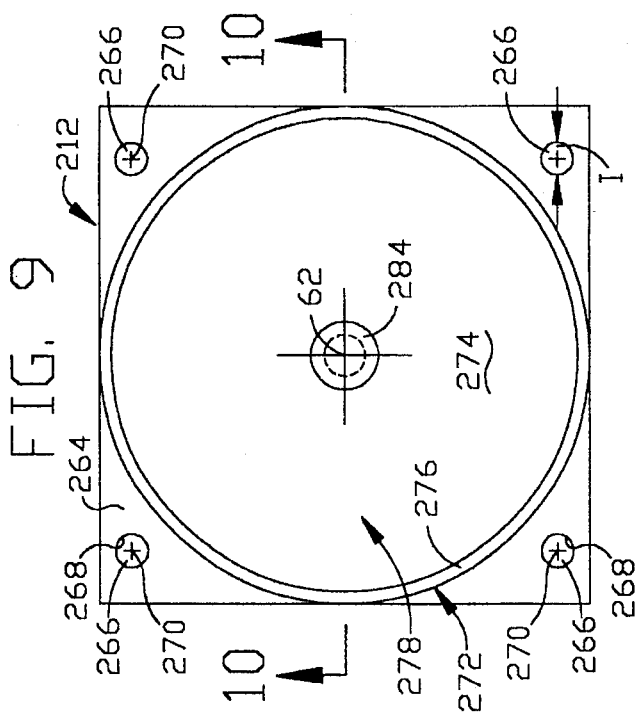
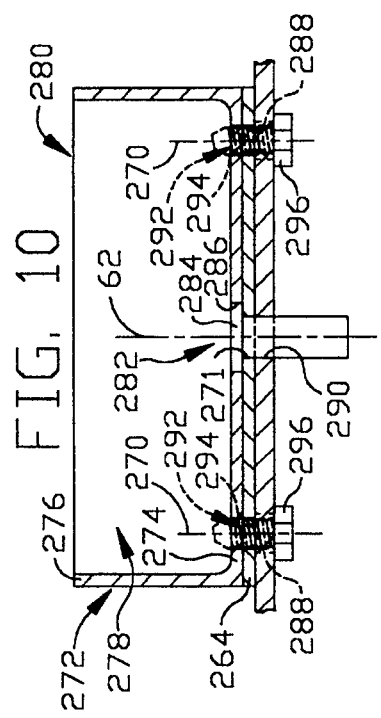
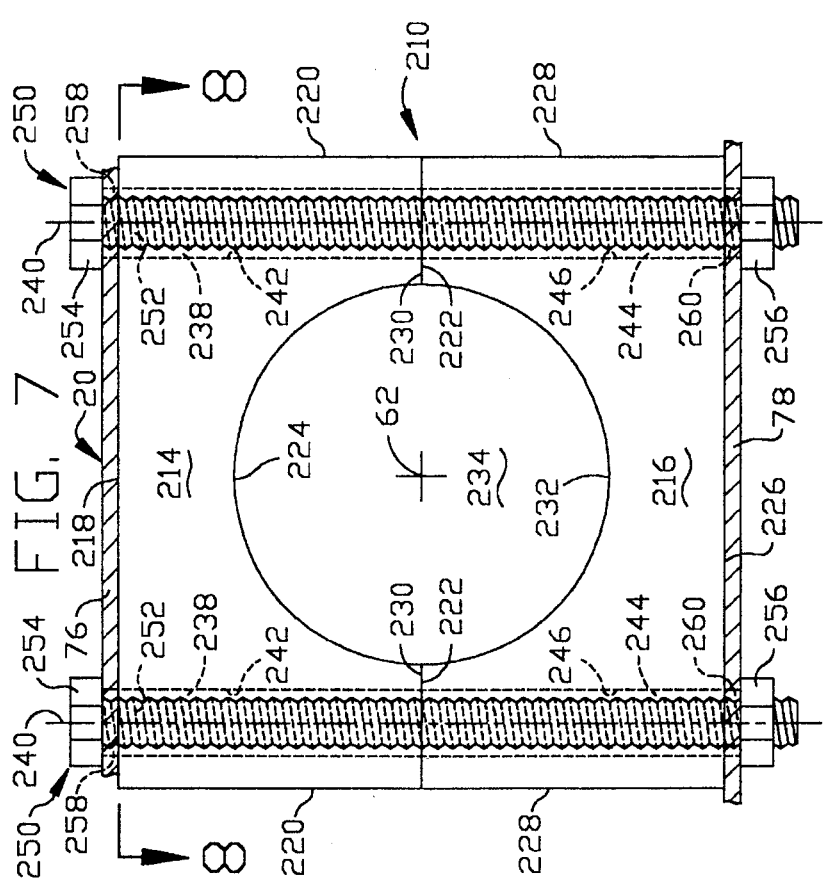
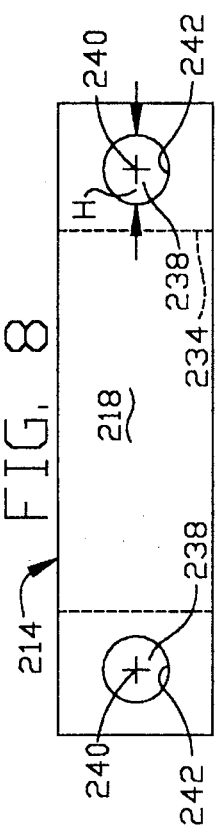

APPARATUS WITH INFLATOR MOUNTING STRUCTURE

BACKGROUND OF THE INVENTION

The present invention relates to an inflator for inflating a vehicle occupant restraint such as an air bag, and particularly relates to a mounting structure for mounting the inflator in a canister.

An inflator for inflating an air bag is actuated upon the occurrence of a vehicle collision requiring air bag inflation to protect an occupant of the vehicle. The inflator provides inflation fluid which flows into the air bag. The inflation fluid inflates the air bag to an inflated condition. When the air bag is inflated, it restrains the occupant of the vehicle from forcefully striking parts of the vehicle as a result of the collision.

The air bag and the inflator are typically assembled together as parts of an air bag module. In addition to the air bag and the inflator, the air bag module includes a reaction canister which houses the air bag and the inflator.

SUMMARY OF THE INVENTION

In accordance with the present invention, an apparatus includes an inflator means for providing a source of inflation fluid. The apparatus includes canister means which has a chamber for receiving the inflator means. The apparatus includes a support means for supporting the inflator means in a fixed position within the chamber of the canister means. The support means includes two clamp halves which have a mating relationship to engage and surround a portion of the inflator means. The support means also includes fastener means for securing the clamp halves in their mating relationship and for securing the clamp halves to the canister means.

BRIEF DESCRIPTION OF THE DRAWINGS

Further features of the present invention will become apparent to those skilled in the art to which the present invention relates from reading the following specification with reference to the accompanying drawings, in which:

FIG. 3 is an enlarged view taken along line 3—3 of FIG. 2, with certain parts removed and illustrating details of the first embodiment;

FIG. 4 is a view taken along line 4—4 of FIG. 3, with certain parts removed;

FIG. 5 is an enlarged view taken along line 5—5 of FIG. 2, with certain parts removed and illustrating details of the first embodiment;

FIG. 6 is a view taken along line 6—6 of FIG. 5, with certain parts removed;

FIG. 7 is a view similar to FIG. 3, but illustrating details of a second embodiment of the present invention;

FIG. 8 is a view taken along line 8—8 of FIG. 7, with certain parts removed;

FIG. 9 is a view similar to FIG. 5, but illustrating details of the second embodiment of the present invention; and FIG. 10 is a view taken along line 10—10 of FIG. 9, with certain parts removed.

DESCRIPTION OF THE PREFERRED EMBODIMENT

Figure 1:
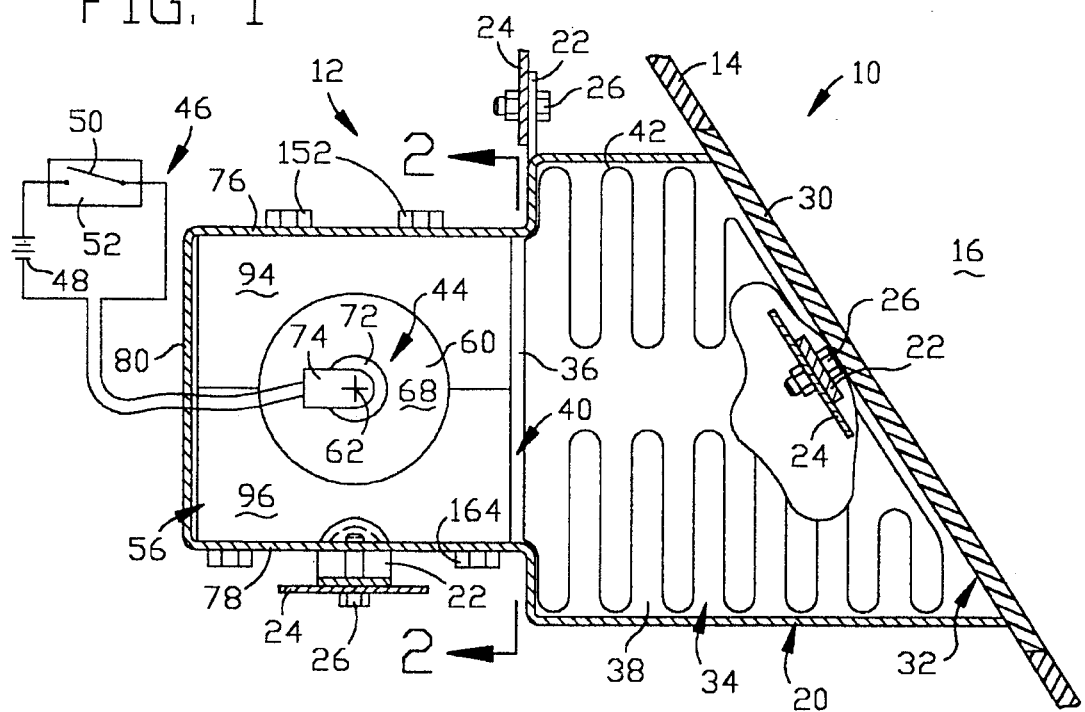
FIG. 1 is a schematic sectional view of a vehicle occupant restraint comprising an embodiment of the present invention.

An apparatus 10 according to the present invention is schematically illustrated in FIG. 1. The apparatus 10 includes an air bag module 12, which is illustrated in FIG. 1 as being mounted in an instrument panel 14, adjacent to a passenger side of a vehicle occupant compartment 16 of a vehicle.

The module 12 includes a reaction canister 20. A plurality of mounting tabs 22 on the exterior of the canister 20 are fixed to supporting parts 24 of the instrument panel 14 by fasteners 26. The structure and arrangement of the mounting tabs 22, the supporting parts 24 and the fasteners 26 can vary, as known in the art.

A deployment door 30 extends over a deployment opening 32 of the canister 20. The door conceals the canister 20 from the vehicle occupant compartment 16. As known in the art, the door 30 can be constructed as part of the module 12 or, alternatively, as a part of the instrument panel 14.

The canister 20 is preferably made of metal and is shaped to define a chamber 34. The chamber 34 has an inner portion 36, located away from the deployment opening 32, and an outer portion 38, located adjacent to the deployment opening 32. An opening 40 communicates the inner portion 36 with the outer portion 38.

The air bag module 12 includes an inflatable vehicle occupant restraint 42, which is commonly referred to as an air bag, and includes an inflator 44 for inflating the air bag 42. The inflator 42 may be any suitable type. For example, the inflator 42 may include ignitable gas generating material as the sole source of inflation fluid, or may include gas stored under pressure as the sole source of inflation fluid. Alternatively, the inflator 42 may include a gas stored under pressure and means for heating the stored gas.

The inflator 44 is located in the inner portion 36 of the chamber 34. The air bag 42 is connected to the canister 20 at the opening 40 in any suitable manner known in the art for receiving an inflation fluid from the inflator 44. In a packed condition, the air bag 42 is stored in the outer portion 38 of the canister chamber 34 and is hidden behind the deployment door 30. Inflation of the air bag 42 causes the air bag 42 to force the deployment door 30 open and to extend into the vehicle occupant compartment 16, as is known in the art.

The apparatus 10 also includes an electrical circuit 46 for activation of the inflator 44. The electrical circuit 46 includes a power source 48, which is preferably the vehicle battery and/or a capacitor, and a normally open switch 50. The switch 50 is part of a sensor 52, which senses a condition indicating the occurrence of a vehicle collision. The collision-indicating condition may comprise, for example, a sudden vehicle deceleration which occurs upon the occurrence of a collision. If the collision-indicating condition is above a predetermined threshold, inflation of the air bag 42 is desired for protecting a vehicle occupant. The sensor 52 closes the switch 50 to activate the inflator 44 electrically and cause inflation of the air bag 42, as will be understood by those skilled in the art.

The module 12 includes a support system 56 (FIG. 2) for securing the inflator 44 to the canister 20, within the inner portion 36 of the chamber 34. The support system 56 is related to the shape of the inflator 44 and the canister 20, which are now discussed in detail.

The inflator 44 includes an elongate, cylindrical outer shell or tank 60 with a longitudinal central axis 62. The tank 60 has a middle portion 64, a butt portion 66 and a neck portion 68. The middle portion 64 extends along the axis 62 and has a circular cross-section with an outer diameter A. The diameter A is substantially constant as the middle portion 64 extends into the butt portion 66. At the butt portion 66, the tank 60 terminates at an end wall 70 which extends generally perpendicular to the axis 62.

The neck portion 68 extends along the axis 62 and is at the end of the tank 60 which is axially opposite to the butt portion 66. A section of the neck portion 68 has a circular cross-section with an outer diameter B. The diameter B is less than the diameter A. The neck portion 68 also has a section which tapers radially inward from the diameter B as the neck portion 68 extends toward a tip 72. A terminal connector 74 is attached to the tank 60 at the tip 72 for connecting an initiator device (not visible) of the inflator 44 with the electrical circuit 46.

The portion of the canister 20 which defines the inner portion 36 of the chamber 34 has a top wall 76, a bottom wall 78, a back wall 80, a first end wall 82 and a second end wall 84. The top, bottom and back walls 76, 78 and 80 are elongate to extend parallel to the axis 62. The top wall 76 perpendicularly intersects the back wall 80 and lies parallel to the bottom wall 78. The bottom wall 78 also perpendicularly intersects the back wall 80.

The first and second end walls 82 and 84 are at axially opposite ends of the canister 20. Each of the end walls 82 and 84 is perpendicular to the axis 62, and intersects each of the top, bottom and back walls 76, 78 and 80. The top wall 76, the bottom wall 78, and the first and second end walls 82 and 84 bound the opening 40 (FIG. 1) between the inner and outer portions 36 and 38 of the chamber 34. As bounded by the walls of the canister 20, the inner portion 36 of the chamber 34 has the shape of a right-angle parallelpiped. The inner portion 36 has an axial length defined between the first and second end walls 82 and 84, a height defined between the top and bottom walls 76 and 78, and a depth defined between the plane of the opening 40 and the back wall 80. The axial length of the inner portion 36 is slightly longer than the axial length of the inflator 44. The height and the depth of the inner portion 36 are greater than the diameter A of the tank 60.

The support system 56 (FIG. 2) includes a clamp assembly 90 and a cup assembly 92 which interfit between the tank 60 of the inflator 44 and the walls of the canister 20 at the inner portion 36. The clamp assembly 90 (FIG. 3, in which the tank 60 is removed) includes top and bottom clamp halves 94 and 96 which are made of steel, plastic or other cast material. The top clamp half 94 has a top planar surface 102, two side planar surfaces 104, two planar abutment surfaces 106 and an arcuate aperture surface 108. The arcuate surface 108 is intermediate the two abutment surfaces 106 and lies at a radius which is equal to, or slightly less than, one-half of the diameter B.

Similarly, the bottom clamp half 96 has a bottom planar surface 110, two side planar surfaces 112, two abutment surfaces 114 and an arcuate aperture surface 116. The arcuate surface 116 is similar to the arcuate surface 108.

The two clamp halves 94 and 96 mate together (shown in FIGS. 1–3) such that the abutment surfaces 106 and 114 engage, or at least face each other in relatively close proximity. In this mated position, the arcuate surfaces 108 and 116 define an aperture 118 (FIG. 3) which has a diameter equal to or slightly smaller than the diameter B.

Figure 2:
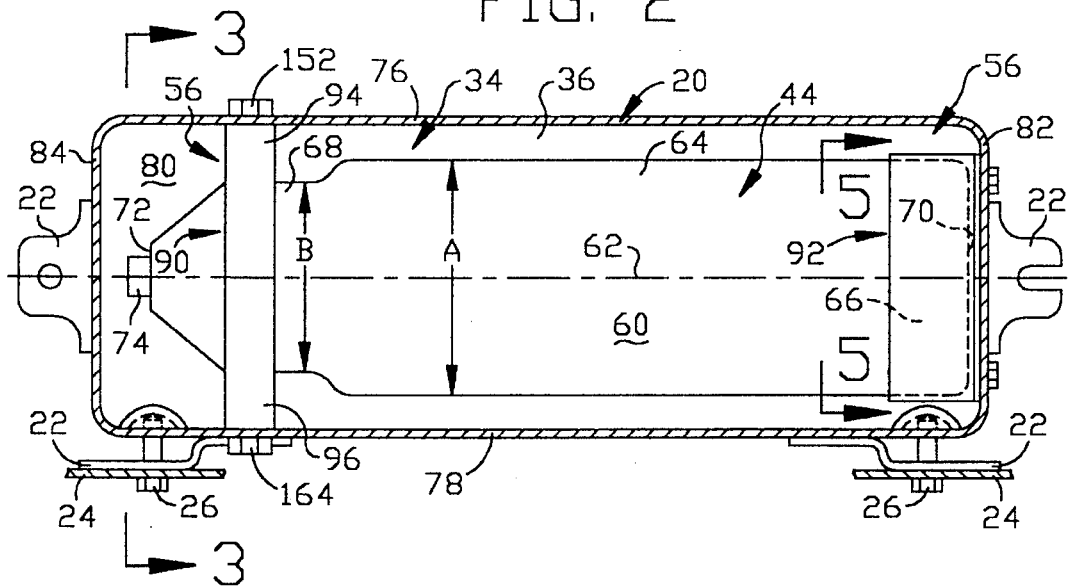
FIG. 2 is a view taken along line 2—2 of FIG. 1.

The neck portion 68 (FIG. 2) of the tank 60 is located within the aperture 118, such that the neck portion 68 is engaged and surrounded by the clamp assembly 90. Specifically, the arcuate surfaces 108 and 116 (FIG. 3) engage the cylindrical section of the neck portion 68, which has the outer diameter B. The relative sizes of the aperture 118 and the neck portion 68 are such that the tank 60 is frictionally held relative to the clamp assembly 90 when the clamp halves 94 and 96 are in their mated position (FIG. 2). Also, in the mated position, the clamp halves 94 and 96 have an overall height which is equal to the height of the inner portion 36 of the chamber 34, and have an overall width which is equal to, or slightly less than, the depth of the inner portion 36 (FIG. 1).

The top clamp half 94 (FIG. 3) has two bores 122, each of which extends along a respective bore axis 124 from the top surface 102 to one of the abutment surfaces 106. Each bore 122 is defined by a first cylindrical bore surface 126 (FIG. 4) and a second cylindrical bore surface 128. Each bore surface 126 (FIG. 3) extends into the upper clamp half 94 from the top surface 102. Each bore surface 128 extends into the upper clamp half 94 from the respective abutment surface 106. Each bore 122 has a diameter C at the respective bore surface 126 and has a diameter D at the respective bore surface 128. The diameter D is less than the diameter C, such that an annular shoulder 130 is defined at the junction between the bore surfaces 126 and 128.

The bottom clamp half 96 has two bores 132, each of which is defined by a cylindrical bore surface 134. Each bore 132 extends through the bottom clamp half 96 from the bottom surface 110 to a respective abutment surface 114. When the clamp halves 94 and 96 are in their mated position, the bores 132 are aligned with the respective bore axes 124. Each bore 132 has a cross-sectional diameter E. The diameter E is less than the diameters C and D.

The clamp assembly 90 has two screw members 136, each of which has a threaded shank 138 and a drive head 140. The threaded shank 138 for each screw member 136 has a helical groove or thread which is tapered at its distal end from the drive head 140. The taper of the threaded shank permits the screw member 136 to be "self-tapping". The drive head 140 is shaped to be engaged by a rotary driving tool (not shown). For example, the drive head 140 may be slotted on the side away from the threaded shank 138 for drive engagement by a blade tool, such as a screw driver, or may have a polygonal exterior shape for drive engagement by a mating polygonal socket tool, such as a wrench.

The outer diameter of each drive head 140 is less than the diameter C of the bore 122 and is greater than the diameter D of the bore 122. A major diameter of the threaded shank 138 is less than the diameters C and D of the bore 122 and is only slightly greater than the diameter E of the aligned bore 132. Thus, with the clamp halves 94 and 96 in their mated position, each screw member 136 passes through its respective bore 122 until the threaded shank 138 engages the bore surface 134. The threaded shank 138 cuts or taps a mating helical groove into the bore surface 134 and penetrates into the lower clamp half 96 until the drive head 140 engages the shoulder 130. The screw members 136 thus hold the clamp halves 94 and 96 in their mated position about the neck portion 68 of the tank 60, such that movement of the tank relative to the clamp assembly 90 is prevented.

The top clamp half 94 also has two bores 144, each of which extends from the top surface 102 along a respective bore axis 146 partially through the top clamp half 94. Each bore 144 is defined by a cylindrical bore surface 148 (FIG. 4) and has a cross-sectional diameter F. The top wall 76 (FIG. 3) 26 of the canister 20 has two circular holes 150 which are aligned with respective bores 144, on the respective bore axes 146, when the clamp assembly 90 and the tank 60 are located within the inner portion 36 of the canister 20. The holes 150 have diameters which are equal to, or slightly greater than, the diameter F.

The support system 56 has two screw members 152, each of which has a threaded shank 154 and a drive head 156. The threaded shanks 154 and the drive heads 156 are similar to the threaded shanks 138 and drive heads 140 of the screw members 136. Further, each drive head 156 has a maximum outer diameter which is greater than the diameter of the holes 150. Each threaded shank 154 has a major outer diameter which is slightly greater than the diameter F.

Thus, when the clamp assembly 90 is located within the inner portion 36 of the chamber 34, each threaded shank 154 extends through a respective hole 150 and into a respective bore 144, with a mating helical groove being cut or tapped into the respective bore surface 148. The drive heads 156 of the screw members 152 are in engagement with the outer surface of the top wall 76. The screw members 152 hold the clamp assembly 90, and thus the tank 60, relative to the canister 20.

The bottom wall 78 of the canister 20 has two circular holes 158 which are aligned with respective bores 132, on the respective bore axes 124, when the clamp assembly 90 and the tank 60 are located within the inner portion 36 of the chamber 34. The holes 158 have diameters which are equal to, or slightly greater than, the diameter E. The support system 56 has two screw members 160, each of which has a threaded shank 162 and a drive head 164 are that similar to the threaded shanks 138 and the drive heads 140 of the screw members 136. Further, each drive head 164 has an outer diameter which is greater than the diameter of the holes 158. Each threaded shank 162 has a major outer diameter which is slightly greater than the diameter E.

When the clamp assembly 90 is located within the inner portion 36 of the chamber 34, each threaded shank 162 extends through a respective hole 158 and into a respective bore 132, with a mating helical groove being cut or tapped into the respective bore surface 134. The drive heads 164 of the screw members 160 are in engagement with the outer surface of the bottom wall 78. Thus, the screw members 160 hold the clamp assembly 90 and the tank 60 relative to the canister 20.

The cup assembly 92 (FIGS. 5 and 6, in which the tank 60 is removed) has a planar back plate 174 which extends perpendicular to the axis 62. The back plate 174 is square or rectangular, and has side lengths which are less than the height and the depth of the inner portion 36 of the chamber 34. Thus, the back plate 174 does not interfere with the top, bottom or back walls 76, 78 and 80 (FIG. 2) of the canister 20.

Four bores 176 (FIG. 5) extend through the back plate 174. Each bore 176 is adjacent to a respective corner of the back plate 174 and is defined by a respective cylindrical bore surface 178 which extends along a respective bore axis 180. The axes 180 are parallel to and offset from the axis 62. Each bore 176 has a diameter G.

A cup member 184 (FIG. 6) extends axially from the back plate 174. The back plate 174 and the cup member 184 are made of metal, plastic or other molded material. Moreover, the back plate 174 and the cup member 184 may be formed as a single piece or may be formed as individual pieces which are affixed together, such as by welding, adhesive or separate fastener means (not shown). In the preferred embodiment, the back plate 174 and the cup member 184 are separate pieces affixed together.

A planar bottom wall 186 of the cup member 184 abuts the back plate 174 and is affixed to the back plate 174. A circular side wall 188 of the cup member 184 (FIG. 5) extends about the axis 62 at a distance equal to, or slightly greater than, one-half the diameter A of the tank 60. The circular side wall 188 extends axially from the bottom wall 186 for a distance great enough to define a cylindrical hollow 190 (FIG. 6). The hollow 190 has an open aperture end 192 at one axial end and is closed at the other axial end by the wall 186.

The butt portion 66 (FIG. 2) of the tank 60 is located within the hollow 190 of the cup member 184 and the end wall 70 abuts the wall 186. The circular wall 188 retains the butt portion 66 and prevents movement of the butt portion 66 in directions which are transverse to the axis 62. Moreover, if the diameter of the circular wall 188 is about equal to the outer diameter A of the tank 60, then a frictional force fit exists between the tank 60 and the cup member 184 such that axial movement of the tank 60 relative to the cup assembly is resisted.

The first end wall 82 of the canister 20 has four circular holes 194 (FIG. 6, only two shown) which are aligned with respective bores 176, on the respective bore axes 180, when the cup assembly 92 and the inflator 44 are located within the inner portion 36 of the chamber 34. The holes 194 have diameters which are equal to, or slightly greater than, the diameter G.

The support system 56 has four screw members 196 (FIG. 6, only two shown), each of which has a threaded shank 198 and a drive head 200. The threaded shanks 198 and the drive heads 200 are similar to the threaded shanks 138 and the drive heads 140 of the screw members 136. Further, each drive head 200 has an outer diameter which is greater than the diameter of the holes 194. Each threaded shank 198 has a major outer diameter which is slightly greater than the diameter G.

Each threaded shank 198 extends through a respective hole 194 and through a respective bore 176, with a mating helical groove being cut or tapped into the respective bore surface 178. The respective heads 200 are in engagement with the outer surface of the first end wall 82, and the back plate 174 of the cup assembly 92 is in engagement with the inner surface of the first end wall 82. The screw members 196 hold the cup assembly 92, and thus the tank 60, relative to the canister 20.

The clamp assembly 90 and the cup assembly 92 retain and support two axial ends of the tank 60 of inflator 44, such that the tank 60 is not in engagement with the canister 20. Moreover, the self-tapping screw members of the support system 56 retain the clamp assembly 90, the cup assembly 92 and the inflator 44 in position within the canister 20 and permit improved speed and efficiency during assembly. Further, the screw members 136, 152, 160 and 196 do not penetrate any portion of the inflator 44. Thus, special mountings need not be affixed (welded) to the tank 60 for receiving the screw member. In other words, the screw members 136, 152, 160 and 192 do not screw in or penetrate any portion of the tank 60 of the inflator 44.

A second embodiment (FIGS. 7–10) of the present invention interacts with the tank 60 of the inflator 44 and the walls of the canister 20 at the inner portion 36 of the chamber 34 in a manner similar to the first embodiment. Thus, the canister 20 and the inflator 44 are referenced utilizing the same reference numerals. The support system of the second embodiment includes a clamp assembly 210 (FIG. 7) and a cup assembly 212 (FIG. 9) which interfit between the tank 60 and the canister 20. The clamp assembly 210 (FIG. 7, in which the tank 60 is removed) includes top and bottom clamp halves 214 and 216 which are made of steel, plastic or other cast material. The top clamp half 210 has a top planar surface 218, two side planar surfaces 220, two planar abutment surfaces 222 and an arcuate aperture surface 224. The arcuate surface 224 is intermediate the abutment surfaces 222 and lies on a radius which is equal to, or slightly less than, one-half of the diameter B.

Similarly, the bottom clamp half 216 has a bottom planar surface 226, two planar side surfaces 228, two abutment surfaces 230 and an arcuate aperture surface 232. The arcuate surface 232 is similar to the arcuate surface 224.

The two clamp halves 214 and 216 mate together such that the abutment surfaces 222 and 230 engage, or at least face each other in a relatively close proximity. In this mated position, the arcuate surfaces 224 and 232 define an aperture 234 which has a diameter equal to or slightly smaller than the diameter B. The neck portion 68 (FIG. 2) of the tank 60 is located within the aperture 234 similar to the first embodiment. Also, similar to the first embodiment, in the mated position, the clamp halves 214 and 216 have an overall height which is equal to the height inner portion 36 of the chamber 34 and have an overall width which is equal to, or slightly less than, the depth of the inner portion 36.

The top clamp half 214 has two bores 238, each of which extends along a respective bore axis 240 from the top surface 218 to one of the abutment surfaces 222. Each bore 238 is defined by a cylindrical bore surface 242 (FIG. 8) and has a diameter H.

The bottom clamp half (FIG. 7) 216 has two bores 244, each of which is defined by a respective cylindrical bore surface 246. Each bore 244 has a diameter H and extends through the bottom clamp half 216 from the bottom surface 226 to a respective abutment surface 230. When the clamp halves 214 and 216 are in their mated position, the bores 238 and 244 are aligned along the respective bore axes 240.

The support system has two bolt members 250, each of which has a threaded shank 252 and a drive head 254. The threaded shank 252 for each bolt member 250 has a helical groove or thread which extends along its length. The drive head 254 is shaped to be engaged by a rotary driving tool (not shown). For example, the drive head 254 may be slotted on the side away from the threaded shank 252 for drive engagement by a blade tool, such as a screw driver, or may have a polygonal exterior shape for drive engagement by a mating polygonal socket tool, such as a wrench. The support system has two retainers or nuts 256 which engage the threaded shanks 252 of the bolt members 250. The nuts 256 have a polygonal exterior shape for drive engagement by a mating polygonal socket tool, such as a wrench.

The top wall 76 of the canister 20 has two circular holes 258 which are aligned with respective bores 238, on the respective bore axes 240, when the clamp assembly 210 and the tank 60 are located within the inner portion 36 of the chamber 34. The holes 258 have diameters which are equal to, or slightly greater than, the diameter H. The bottom wall 78 of the canister 20 has two circular holes 260 which are aligned with respective bores 244, on the respective bore axes 240, when the clamp assembly 210 and the tank 60 are located in the inner portion 36 of the chamber 34. The holes 260 have diameters which are equal to, or slightly greater than, the diameter H.

The threaded shanks 252 of the bolt members 250 extend through the holes 258, the bores 238, the bores 244, and the holes 260, without threadedly engaging the canister 20 or the clamp halves 214 and 216. The drive heads 254 of the bolt members 250, which have outer diameters greater than the diameter of the holes 258, engage the outer surface of the top wall 76. The nuts 256, which have outer diameters greater than the diameter of the holes 260, are tightened onto the threaded shanks 252 and engage the outer surface of the bottom wall 78. Thus, the bolt members 250 and the nuts 256 hold the clamp assembly 210 and the tank 60 relative to the canister 20.

The cup assembly 212 (FIGS. 9 and 10, in which the tank 60 is removed) has a planar back plate 264 which extends perpendicular to the axis 62. The back plate 264 (FIG. 9) is square or rectangular, and has side lengths which are less than the height and the depth of the inner portion 36 of the chamber 34. Thus, the back plate 264 does not interfere with the top, bottom or back walls 76, 78 and 80 of the canister 20.

Four bores 266 extend through the back plate 264. Each bore 266 is adjacent to a respective corner of the back plate 264 and is defined by a respective cylindrical bore surface 268 which extends along a respective bore axis 270. The axes 270 are parallel to and offset from the axis 62. Each bore 266 has a diameter I. A hole 271 (FIG. 10) centered on the axis 62 also extends through the back plate 264.

A cup member 272 extends axially from the back plate 264. The back plate 264 and the cup member 272 are made of metal, plastic or other molded material. Moreover, the back plate 264 and the cup member 272 may be formed as a single piece or may be formed as individual pieces which are affixed together, such as by welding, adhesive or separate fastener means (not shown). In the preferred embodiment, a back plate 264 and the cup member 272 are separate pieces that are fixed together.

A planar bottom wall 274 of the cup member 272 abuts the back plate 264 and is affixed to the back plate 264. A circular side wall 276 of the cup member 272 (FIG. 9) extends about the axis 62 at a distance equal to, or slightly greater than, one-half the diameter A of the tank 60. The circular side wall 276 extends axially from the bottom wall 274 (FIG. 10) for a distance great enough to define a cylindrical hollow 278. The hollow 278 has an open aperture end 280 at one axial end and is closed at the other axial end by the wall 274. Similar to the first embodiment, the butt portion 66 of the tank 60 is located within the hollow 278 of the cup member 272. Thus, movement of the tank 60 in directions transverse to the axis 62 is prevented. If the diameter of the circular wall 276 is about equal to the outer diameter A, then a frictional force fit exists between the tank 60 and the cup member 272 such that axial movement of the tank 60 relative to the cup assembly 212 is resisted.

A projection stud 282 of the cup assembly 212 has a head 284. The wall 274 has a hole 286 and the back plate 264 has a hole 271, which are aligned on the axis 62. The projection stud 282 extends through the hole 286 and the hole 271 such that the head 284 is seated within the hole 286. The projection stud 282 is affixed to the back plate 264 and the cup member 272 by any suitable means, such as by welding, adhesive, or separate retainer (not shown). The projection stud 282 extends beyond the back plate 264 in an axial direction opposite to the direction in which the cup member 272 opens.

The first end wall 82 of the canister 20 has four circular holes 288 (FIG. 10, only two shown) which are aligned with respective bores 266, on the respective bore axes 270, when the cup assembly 212 and the inflator 44 are located within the inner portion of the chamber 34. The holes 288 have diameters which are equal to, or slightly less than, the diameter I. The first end wall 82 also has a circular hole 290 which is aligned with the axis 62 and which has a diameter equal to, or slightly greater than, the projection stud 282. When the cup assembly 212 and the inflator 44 are located within the inner portion 36 of the chamber 34, the projection stud 282 extends through the hole 290. Thus, the projection stud 282 provides a means for aligning the cup assembly 212 relative to the canister 20.

The support system has four screw members 292 (FIG. 10, only two shown), each of which has a threaded shank 294 and a drive head 296. The screw members 292 are similar to the screw members 196 of the first embodiment and engage and hold the cup assembly 212 similar to the engagement and holding of the cup assembly 92 by the screw members 196 of the first embodiment. Thus, when the cup assembly 212 is located within the inner portion 36 of the chamber 34, each threaded shank 294 extends through a respective hole 288 and through a respective bores 266, with a mating helical groove being cut or tapped into the respective bore surface 268. The drive heads 296 of the screw members 292 are in engagement with the outer surface of the first end wall 82 of the canister 20, and the back plate 264 is in engagement with the inner surface of the first end wall 82. The screw members 292 hold the cup assembly 212, and thus the tank 60, relative to the canister 20.

Thus, the clamp assembly 210 and the cup assembly 212 retain and support two axial ends of the tank 60 of the inflator 44. The tank 60 is not in engagement with the canister 20, and special mountings need not be affixed to the tank 60.

From the above description of the invention, those skilled in the art will perceive improvements, changes and modifications. Such improvements, changes and modifications within the skill of the art are intended to be covered by the appended claims.

Having described the invention, the following is claimed:

1. An apparatus comprising:
    inflator means for providing a source of inflation fluid;
    canister means having a chamber for receiving said inflator means; and
    support means for supporting said inflator means in a fixed position within said chamber of said canister means;
    said support means including two clamp halves which have a mating relationship to engage and surround a portion of said inflator means, and fastener means for securing said clamp halves to each other in their mating relationship and for securing said clamp halves to said canister means.

2. An apparatus as set forth in claim 1, wherein said fastener means includes a member having a threaded portion.

3. An apparatus as set forth in claim 2, wherein said member extends between said clamp halves.

4. An apparatus as set forth in claim 3, wherein said threaded portion of said member is in threaded engagement with one of said clamp halves.

5. An apparatus as set forth in claim 2, wherein said member extends between said canister means and one of said clamp halves.

6. An apparatus as set forth in claim 5 wherein said threaded portion of said member is in threaded engagement with said one of said clamp halves.

7. An apparatus as set forth in claim 2, wherein one of said clamp halves has a bore, said member extends through said bore without threaded engagement with said one of said clamp halves.

8. An apparatus as set forth in claim 7, wherein each of said clamp halves has a bore, said member extends through said bores without threaded engagement with said clamp halves.

9. An apparatus as set forth in claim 8, wherein said fastener means includes a threaded retainer for engagement with said threaded portion of said member.

10. An apparatus as set forth in claim 8, wherein said member extends through a portion of said canister means.

11. An apparatus as set forth in claim 10, wherein said fastener means includes a threaded retainer for engagement with said threaded portion of said member, said threaded retainer engaging said canister means at an exterior of said canister means.

12. An apparatus as set forth in claim 1, wherein said fastener means includes first and second members having first and second threaded portions, respectively.

13. An apparatus as set forth in claim 12, wherein said first member extends between said clamp halves, said second member extends between said canister means and one of said clamp halves.

14. An apparatus as set forth in claim 13, wherein said first threaded portion is in threaded engagement with one of said clamp halves.

15. An apparatus as set forth in claim 1, wherein said clamp halves define an aperture, said inflator means extends through said aperture.

16. An apparatus as set forth in claim 1, wherein each of said clamp halves is in engagement with said canister means.

17. An apparatus as set forth in claim 1, wherein said inflator means is held out of engagement with said canister means by said support means.

18. An apparatus as set forth in claim 1, wherein no portion of said inflator means is penetrated by any portion of said support means.

19. An apparatus as set forth in claim 1, wherein said inflator means has an axis, and first and second axially opposite end portions, said support means includes a cup member and cup fastener means for securing said cup member to said canister means, said clamp halves engage said inflator means at said first end portion, said cup member engages said inflator means at said second end portion, said cup fastener means includes a threaded member which extends between said canister means and said cup member and is in threaded engagement with said cup member.

20. An apparatus as set forth in claim 19, wherein said cup member has an axial projection, said canister means has an aperture, said projection extending into said aperture for aligning said cup member relative to said canister means.

* * * * *